(12) United States Patent
Byeon

(10) Patent No.: US 12,530,898 B2
(45) Date of Patent: Jan. 20, 2026

(54) ARTIFICIAL INTELLIGENCE ASSISTANT DEVICE AND SYSTEM BASED ON DOOR IMAGE ANALYSIS

(71) Applicant: Won International Inc., Gwangju (KR)

(72) Inventor: Cheolwon Byeon, Gwangju (KR)

(73) Assignee: Won International Inc., Gwangju (KR)

( * ) Notice: Subject to any disclaimer, the term of this patent is extended or adjusted under 35 U.S.C. 154(b) by 250 days.

(21) Appl. No.: 18/039,008

(22) PCT Filed: Sep. 15, 2021

(86) PCT No.: PCT/KR2021/012637
§ 371 (c)(1),
(2) Date: May 26, 2023

(87) PCT Pub. No.: WO2022/114479
PCT Pub. Date: Jun. 2, 2022

(65) Prior Publication Data
US 2023/0419668 A1  Dec. 28, 2023

(30) Foreign Application Priority Data
Nov. 26, 2020 (KR) .................. 10-2020-0161023

(51) Int. Cl.
*G06V 20/52* (2022.01)
*A61B 5/024* (2006.01)
(Continued)

(52) U.S. Cl.
CPC .......... *G06V 20/52* (2022.01); *A61B 5/02438* (2013.01); *A61B 5/14551* (2013.01); *G06Q 30/0631* (2013.01)

(58) Field of Classification Search
CPC ................ G06V 20/52; A61B 5/02438; A61B 5/14551; G06Q 30/0631
See application file for complete search history.

(56) References Cited

U.S. PATENT DOCUMENTS 10,789,820 B1 * 9/2020 Jones ................. G07C 9/00571
2018/0342329 A1   11/2018 Rufo et al.
(Continued)

FOREIGN PATENT DOCUMENTS

JP     2003-162732      6/2003
JP    2003174579 A     6/2003
(Continued)

OTHER PUBLICATIONS

International Journal for Research in Applied Science & Engineering Technology (IJRASET), ISSN: 2321-9653: IC Value: 45.98; SJ Impact Factor: 7.429, vol. 8 Issue VI.Jun. 2020.

*Primary Examiner* — Ming Shui
(74) *Attorney, Agent, or Firm* — INVENSTONE PATENT, LLC

(57) ABSTRACT

One embodiment of the present disclosure provides an artificial intelligence (AI) assistance device based on door image analysis. The device comprises: an image reception unit for receiving an image captured by a camera attached to a door, the image including an image of a person entering or exiting through the door; and a processor, which uses a storage place for storing the received image and an AI model, so as to analyze the image stored in the storage, and thus infers the characteristics of the entering or exiting person and provides information corresponding to the inferred characteristics.

20 Claims, 10 Drawing Sheets

(51) Int. Cl.
    *A61B 5/1455*     (2006.01)
    *G06Q 30/0601*     (2023.01)

(56)         References Cited

U.S. PATENT DOCUMENTS

| | | | |
|---|---|---|---|
| 2019/0066470 | A1 | 2/2019 | Jeon et al. |
| 2019/0355193 | A1 | 11/2019 | Kirsch et al. |
| 2020/0349249 | A1 | 11/2020 | Weston et al. |
| 2022/0147224 | A1* | 5/2022 | Alliata .................... G06T 11/60 |
| 2022/0207972 | A1* | 6/2022 | Madden ........... G08B 13/19645 |

FOREIGN PATENT DOCUMENTS

| | | | |
|---|---|---|---|
| JP | 3907168 | A | 4/2007 |
| JP | 2012-022319 | A | 2/2012 |
| JP | 2016-532197 | A | 10/2016 |
| JP | 2017-062319 | A | 3/2017 |
| JP | 3218348 | U | 10/2018 |
| JP | 2020-166399 | A | 10/2020 |
| KR | 10-2003-0006474 | A | 1/2003 |
| KR | 10-2014-0059978 | A | 5/2014 |
| KR | 20140059978 | A | 5/2014 |
| KR | 10-1535591 | A | 7/2015 |
| KR | 10-1975506 | A | 5/2019 |
| KR | 10-2019-0114717 | A | 10/2019 |
| KR | 10-2020-0039365 | A | 4/2020 |
| KR | 20200039365 | A | 4/2020 |

* cited by examiner

ARTIFICIAL INTELLIGENCE ASSISTANT DEVICE AND SYSTEM BASED ON DOOR IMAGE ANALYSIS

CROSS-REFERENCE TO RELATED APPLICATIONS

This application is a National Stage filing under 35 U.S.C. 371 of International Application No. PCT/KR2021/012637, filed on Sep. 15, 2021, which claims the benefit of earlier filing date and right of priority to Korean Application No. 10-2020-0161023, filed on Nov. 26, 2020 in the Korean Intellectual Property Office, the contents of which are all hereby incorporated by reference herein in their entirety.

BACKGROUND

Technical Field

The present disclosure relates to an artificial intelligence (AI) assistant device, and more particularly, to an AI assistant device for implementing a smart home.

Background Art

These days, most households have home automation devices based on the Internet of Things (IoT). Most home automation devices take actions for user convenience, and for this purpose, may have a user status check function.

However, there is an inconvenience that a user has to take an independent action, such as taking a survey which requires a separate period of time or capturing an image separately, to check the user's status. In addition, the amount of information obtained in this way is not large and the types of information are not diverse, so there is a problem in that it is difficult to perform accurate check and provision of information accordingly is not appropriate.

SUMMARY

An object according to an aspect of the present disclosure for solving the above problems is to provide an AI assistant device for guiding necessary information to a user based on an artificial intelligence model by analyzing an image captured through a door camera.

An artificial intelligence (AI) assistant device based on door image analysis, in accordance with one aspect of the present disclosure, may include: an image receiver for receiving an image captured by a camera attached to a door, the image including an image of a person entering/exiting the door; a storage that stores the received image; and a processor for inferring characteristics of the entering/exiting person by analyzing the image stored in the storage using an AI model, and providing information corresponding to the inferred characteristics.

The processor may infer at least one of a physical condition, a body shape, and a body size.

The processor may recommend a product corresponding to the inferred characteristics.

The processor may infer a physical health condition, and recommend a diet menu or product corresponding to the inferred physical health condition using a body diet model.

The processor may infer a body shape or body size, and recommend a clothing or product corresponding to the inferred body shape or body size.]

The device may further include: a display device for visualizing and displaying the corresponding information; and a speaker for outputting the corresponding information as a voice.

The display device is a touch screen, and may display memo information to the entering/exiting person through the touch screen.

The processor may identify a person in the image by analyzing an object in the image, wherein the processor may identify a person related to the memo information, and when the identified person corresponding to the memo information enters the door, may display the memo information corresponding to the person.

The device may further include: a motion sensor for detecting that a person is moving, wherein the processor provides the corresponding information when motion is detected through the motion sensor.

When the motion is detected, the processor may identify the person who causes the motion and infer the characteristics of the identified person to provide information corresponding to the inferred characteristics.

The AI assistant device communicates with a server device associated with an application running on a user terminal, and the AI assistant device may provide the corresponding information to the user terminal when the application is executed in the user terminal.

The server device may communicate in a cloud-based network, a home network, or a D2D (Device to Device) method, and the information stored in the storage may be transmitted to the server device.

The processor may identify each of a first entering/exiting person and a second entering/exiting person, inform the first entering/exiting person of first information corresponding thereto, and inform the second entering/exiting person of second information corresponding thereto, and the first entering/exiting person and the second entering/exiting person may be identified by determining whether the number of times they have entered/exited the door exceeds a threshold value.

The processor may analyze the stored image to infer physiognomy information and fortune information of the entering/exiting person, and the physiognomy information and fortune information may be inferred using an oriental studies solution.

The processor may provide advertisement contents to be displayed on the display device to the display device, and the display device may display the advertisement contents received from the processor.

At least one of the display device and the speaker may be provided in the form of a kiosk.

The device may further include a microphone for acquiring voice information of the entering/exiting person, and the processor may infer the characteristics of the entering/exiting person using the voice information acquired through the microphone.

The artificial intelligence model may operates in association with a server that manages criminal identity information, medical information, and insurance information to provide information related to the entering/exiting person using the criminal identity information, the medical information, and the insurance information.

The AI assistant device may operate in association with an online banking server related to an account of the entering/exiting person to provide online banking function using the account.

The processor may operate in association with a wearable device that is attached to the entering/exiting person and measures a health status of the entering/exiting person to provide medical and insurance information related to the entering/exiting person using information obtained from the wearable device.

The wearable device may acquire information on at least one of an average blood oxygen saturation level and an average heart rate wave value and provide the acquired information to the processor.

The processor may analyze an object in the stored image through dynamic data, and the dynamic data may include at least one of a video, a light source, and a graph.

Data to be analyzed by the processor may include at least one of a body shape, size, shadow by time, light reflection of a body depending on a light source, skeleton, head, hair, hand shape, fingerprint, palm lines, pores, blood vessels, retina, iris, face, body temperature, gait, voice and sound waves of the entering/exiting person.

The processor may utilize at least one of information related to the entering/exiting person in an SNS server and an application server, and information stored in a memory of a device carried by the entering/exiting person, in order to more accurately infer the characteristics of the entering/exiting person.

The processor may infer the fortune information of the entering/exiting person by analyzing palmistry information of the entering/exiting person.

An artificial intelligence (AI) assistant system based on door image analysis, in accordance with another aspect of the present disclosure, may include: a camera attached to a door to photograph a person entering/exiting the door; an AI assistant device that infers characteristics of the entering/exiting person by analyzing an image captured by the camera using an artificial intelligence model, and provides information corresponding to the inferred characteristics to an output device; and the output device that outputs information provided from the AI assistant device.

According to the door image-based AI assistant device of the present disclosure, since information about the user is accumulated through the camera attached to the door through which the user enters/exits every day without a separate image capturing or user's status information input work, more accurate information necessary for the user can be provided, and the user's effort for providing the information is not required, which increases user convenience.

DESCRIPTION OF EXEMPLARY EMBODIMENTS

Figure 1:
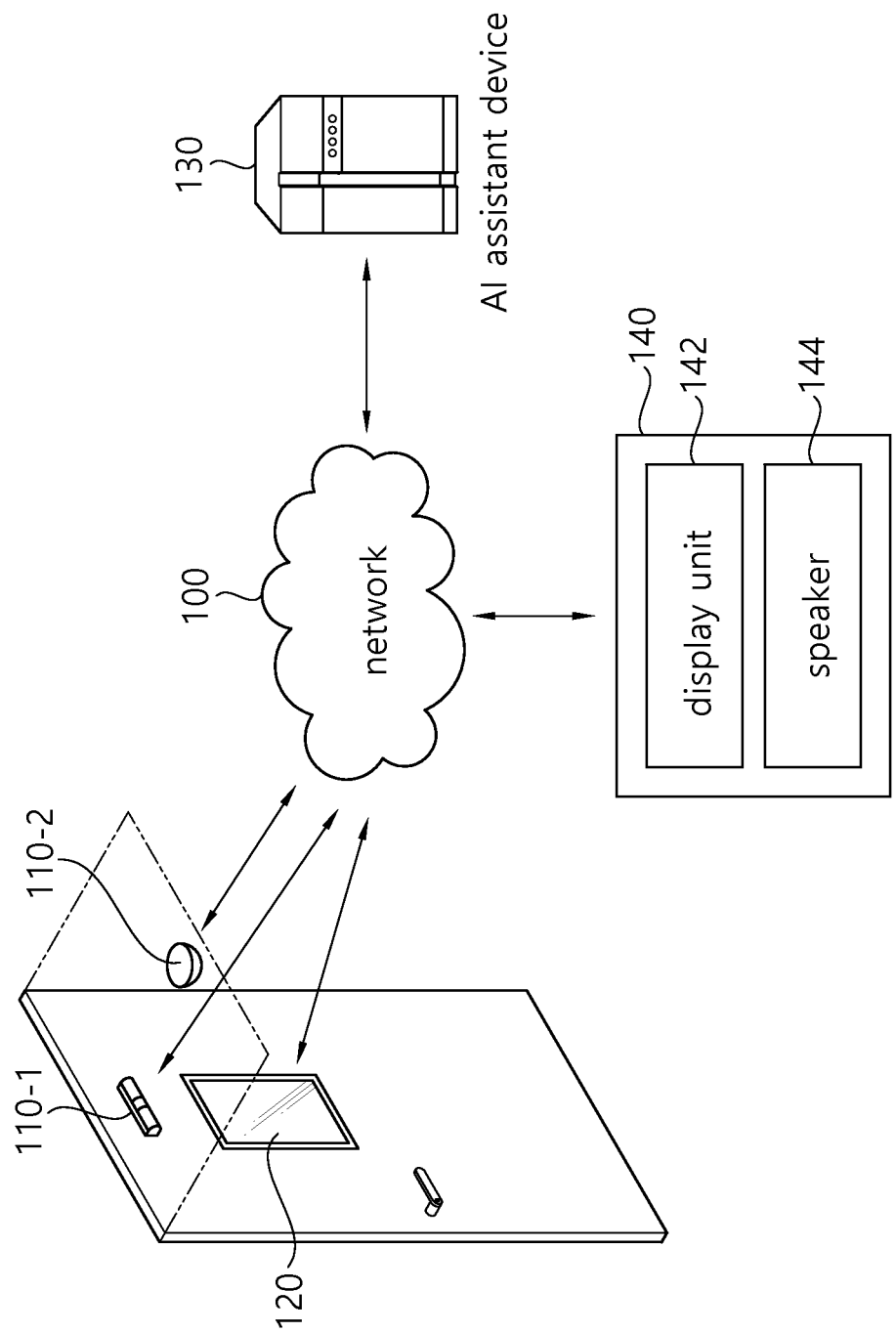
FIG. 1 is a conceptual diagram showing a system including an AI assistant device based on door image analysis according to one embodiment of the present disclosure.

The present disclosure may be variously modified and have various embodiments, and specific embodiments are illustrated in the drawings and described in detail.

However, it should be understood that this is not intended to limit the present disclosure to the specific embodiments, and the present disclosure includes all modifications, equivalents, and substitutes included in the idea and scope of the present disclosure.

Terms, such as first, second, etc., may be used to describe various components, but the components should not be limited by the terms. These terms are only used for the purpose of distinguishing one component from another. For example, a first component may be termed a second component, and similarly, the second component may be termed the first component, without departing from the scope of the present disclosure. The term "and/or" includes any combination of a plurality of related items or any of the plurality of related items.

It should be understood that when a component is referred to as being "connected" or "linked" to another component, it may be directly connected or linked to the another component, but other components may exist therebetween. Meanwhile, it should be understood that when a component is referred to as "directly connected" or "directly linked" to another component, no other elements exist therebetween.

Terms used in the present specification are only used to describe the specific embodiments, and are not intended to limit the present disclosure. Singular expressions include plural expressions unless the context clearly indicates otherwise. In the present specification, it should be understood that the terms "include" or "have" are intended to designate that there is a feature, number, step, operation, component, part, or combination thereof described in the specification, but the possibility of presence or addition of one or more other features, numbers, steps, operations, components, parts, or combinations thereof is not precluded.

Unless defined otherwise, all terms used herein, including technical or scientific terms, have the same meaning as commonly understood by those skilled in the art to which the present disclosure pertains. Terms such as those defined in commonly used dictionaries should be interpreted as having a meaning consistent with the meaning in the context of the related art, and unless explicitly defined in the present specification, they should not be interpreted in an ideal or excessively formal meaning.

Hereinafter, with reference to the accompanying drawings, preferred embodiments of the present disclosure will be described in more detail. In order to facilitate overall understanding, in the description of the present disclosure, the same reference numerals are used for the same components in the drawings, and redundant descriptions of the same components are omitted.

FIG. 1 is a conceptual diagram showing a system including an AI assistant device based on door image analysis according to one embodiment of the present disclosure. As shown in FIG. 1, the AI assistant system according to one embodiment of the present disclosure may include a network 100, door photographing cameras 110-1 and 110-2, a door lock device 120, and an AI assistant device 130, and an output device 140.

Referring to FIG. 1, the door photographing cameras 110-1 and 110-2 capture an image of a person entering/exiting through a door. The door photographing cameras 110-1 and 110-2 are installed outside and/or inside the door to photograph a region outside the door and a region inside the door. The door photographing cameras 110-1 and 110-2 may capture images of persons entering and exiting and provide the captured images to the AI assistant device 130 through the network 100. In one example, the camera may normally only capture an image without transmitting the image, and may provide the image to the AI assistant device 130 only when an object exists in the image. Alternatively, it may be set to initiate a photographing function and an image transmission function only when entry/exit of a person is detected in association with a motion sensor.

The door lock device 120 operates in association with the AI assistant device 130 and controls opening/closing of the door. The door lock device 120 may be locked and unlocked by various methods such as a fingerprint recognition method, a button method, a pattern method, and an iris recognition method, and may be locked and unlocked using a push-pull method or a rotary knob method. The door lock device 120 may also operates in association with the AI assistant device 130.

The AI assistant device 130 operates in association with the door photographing cameras 110-1 and 110-2, the door lock device 120 and the output device 140 through the network 100. The AI assistant device 130 obtains image information from the door photographing cameras 110-1 and 110-2 and analyzes it to infer characteristics of a person entering/exiting, and provides information corresponding to the inferred characteristic through the output device 140. The AI assistant device 130 may be implemented as a computing device and includes a processor for image analysis and characteristic inference. In one example, the AI assistant device 130 may be a computing device provided in a house. In some cases, the AI assistant device 130 may be referred to as mobile station (MS), user equipment (UE), user terminal (UT), wireless terminal, access terminal (AT), terminal, fixed or mobile subscriber unit, subscriber station (SS), cellular telephone, wireless device, wireless communication device, wireless transmit/receive unit (WTRU), mobile node, mobile, mobile station, personal digital assistant (PDA), smartphone, laptop, netbook, personal computer, wireless sensor, consumer electronic (CE) or other terms. In some cases, the AI assistant device 130 may be implemented as a device manufactured integrally with the door lock device 120.

The output device 140 includes a display unit 142 and a speaker 144. These may be implemented in one device or may be implemented as separate devices. The output device 140 may be provided in a form attached to a door. That is, when a person exits the door, the display unit 142 attached to the door may recommend a product or provide related information to attract purchase, and the speaker 144 may be used to output guidance voice. The display unit 142 may be a touch screen. In some cases, the display unit 142 and the speaker 144 may be implemented in the form of a kiosk disposed in a house or in front of the house or at an entrance to an apartment.

The network 100 includes a local area network for wireless communication within in a house. This includes at least one of Wi-Fi, Bluetooth, and Zigbee communication. In another example, the network 100 may include broadband communications, such as 3G, LTE, 5G communications, and/or wired communications.

Figure 2:
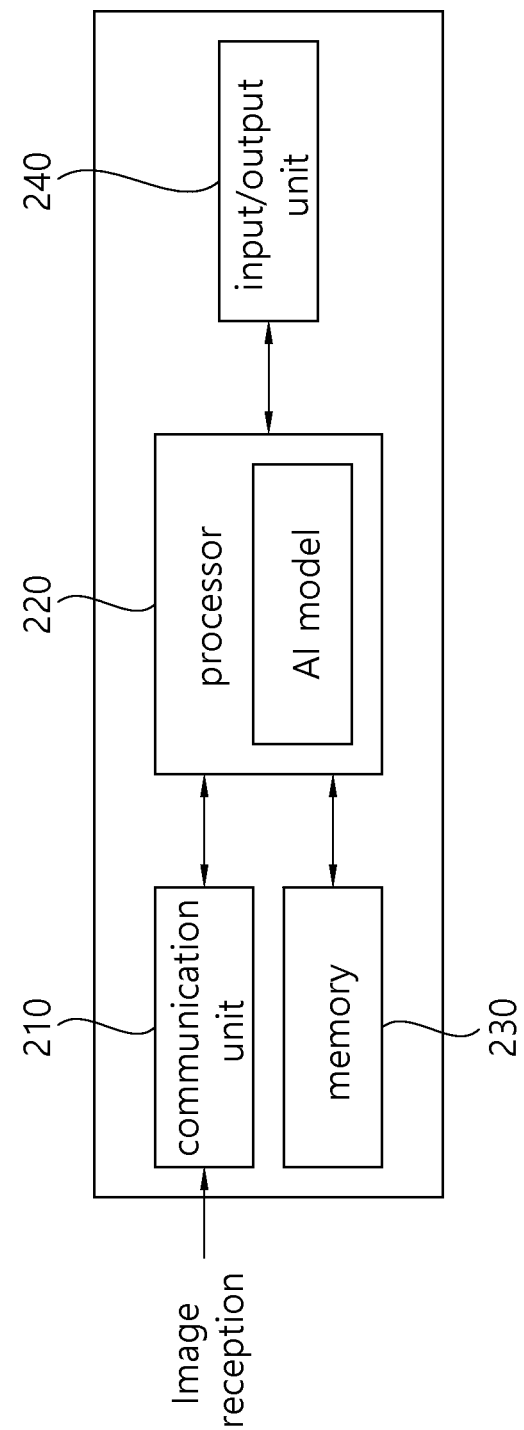
FIG. 2 is a detailed block diagram showing the configuration of the AI assistant device based on door image analysis according to one embodiment of the present disclosure.

FIG. 2 is a detailed block diagram showing the configuration of the AI assistant device based on door image analysis according to one embodiment of the present disclosure. As shown in FIG. 2, the AI assistant device according to one embodiment of the present disclosure may include a communication unit 210, a processor 220, a memory 230 and an input/output unit 240.

Referring to FIG. 2, the communication unit 210 is a component that communicates with an external device through a wired and/or wireless network. The communication unit 210 may include an antenna and/or a communication processor.

The processor 220 is a component that executes image analysis and characteristic inference functions and additional functions accordingly, and executes a program or application related to the function. The processor 220 may execute a program related to an artificial intelligence model. The artificial intelligence model may include an image analysis model (object inference model), a voice analysis model, a model that infers object characteristics, and a model that retrieves and outputs information corresponding to the inferred characteristics. This may include at least one of an Artificial Neural Network (ANN), a Deep Neural Network (DNN), a Convolution Neural Network (CNN), and a Recurrent Neural Network (RNN).

The processor 220 is connected to the memory 230 through a signal line, and executes a program stored in the memory 230.

The memory 230 (which may be referred to as "storage") is a storage device that stores instructions related to programs to be executed by the processor 220 and data processed by the processor 220. The memory 230 may store image information obtained from the door photographing camera.

The input/output module 240 includes information input means such as a keyboard and mouse, and information output means such as a monitor, TV, and touch screen. This may be the same or similar as the output device 140 of FIG. 1 or may be implemented as a separate device for the AI assistant device.

Figure 3:
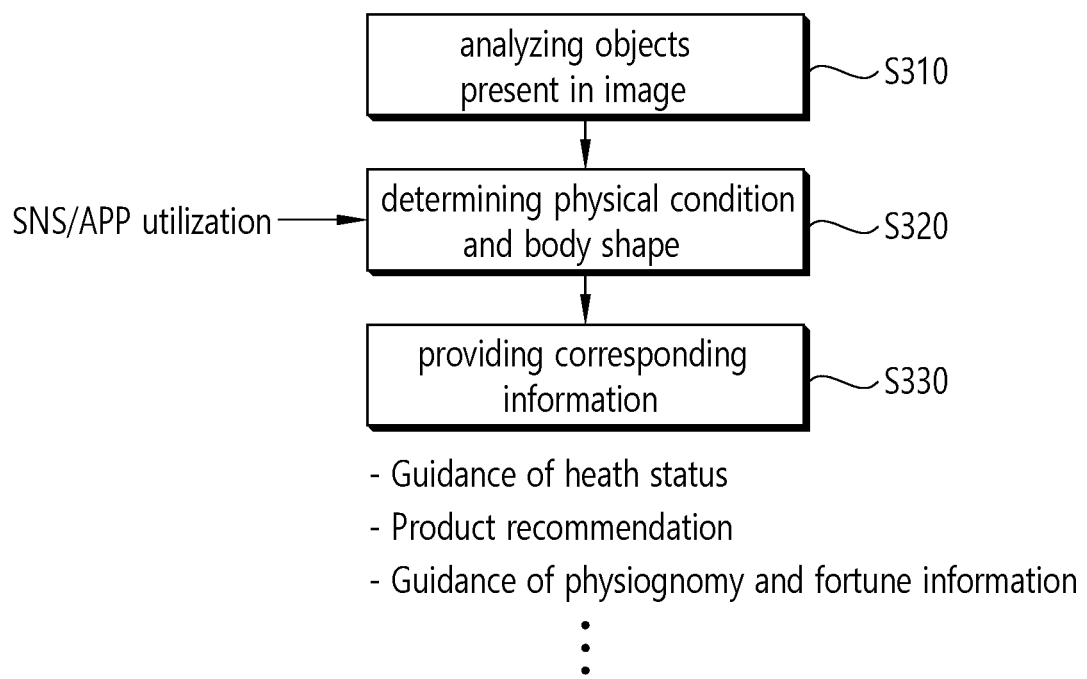
FIG. 3 is a flowchart showing an operating method of the AI assistant device based on door image analysis according to one embodiment of the present disclosure.

FIG. 3 is a flowchart showing an operating method of the AI assistant device based on door image analysis according to one embodiment of the present disclosure.

Referring to FIG. 3, the device receives image information from the door photographing camera. Then, the device analyzes objects present in the image (S310). In this case, the device determines whether the object present in the image is a person, and analyzes the state of the body of the person and items (e.g., clothes, shoes, and other accessories)

attached to the body. The device identifies and recognizes the entering/exiting person by accumulating and utilizing image information through the door image, and continuously updates the status of the recognized person. In this case, when collecting images, information on a photographing time point may be provided, and when analyzing the images, the photographing time point and other environment information at the corresponding time point may be analyzed together. Accordingly, based on the environment corresponding to a current environment and a current time point, information and products corresponding thereto may be guided by referring to image information of the same environment and time point in the past.

The device determines a physical condition and body shape of the entering/exiting person, and conditions of related items as a result of image analysis (S320). The device accumulates image data taken by the door camera on a daily basis to infer the state of the entering/exiting person. The device determines the current state of the entering/exiting person or related items by determining whether the body shape has changed, whether there are wounds on the body, whether the hair has grown beyond a reference value, etc.

More specifically, the AI assistant device may process dynamic data as well as static photo data. The device may analyze objects in the stored image through the dynamic data. In this case, the dynamic data includes at least one of a video, a light source, and a graph. In particular, the device may include one of a body shape and size of a person, including various clothing and accessories worn by the person, hourly shadow, body light reflection according to light source, skeleton, head, hand shape, fingerprint (which can be confirmed through the door lock device), palm lines, pores, blood vessels, retina, iris, face, body temperature, gait, and voice and sound waves (obtainable through a microphone).

Meanwhile, when the device identifies the entering/exiting person through the door image, for more accurate identification, after the device has identified the entering/exiting person, the device may accumulate and utilize more data for analysis by accumulating, sharing, and linking user information registered in the memory (image data in memory), image storage application, and social network service (SNS) installed in the user terminal of the identified person. In this case, it is preferable that related settings are made in advance so that the devices, applications, SNS, etc. related to the identified person can be linked. At this time, collection consent, collection cycle, and items to be collected can be selected in detail through user settings or the like.

The device provides corresponding information based on the inferred state information (S330). The device may accumulate environmental information and recommend appropriate clothing corresponding to today's weather forecast. For example, as the body shape fluctuates beyond a reference value, products such as clothes and shoes suitable for the changed body shape may be recommended in a new size. In addition, when it is confirmed that hair or nails have grown beyond a reference value, hair/nail cuts may be recommended. In this case, in association with credit card company information, the device may automatically recommend sending a reservation text message to a hair salon that the person has previously attended. When the person inputs only the information "yes" on the recommendation screen of the AI assistant device, the AI assistant device may automatically transmit reservation information to a terminal of the corresponding beauty salon.

In addition, the device may infer a health status of the entering/exiting person through body shape analysis and physical condition analysis, and recommend a diet menu or related products corresponding to the current physical condition using a body diet analysis model. As described above, based on the inferred body shape or body size, the device may recommend clothes and products corresponding thereto. In this case, it is desirable to consider information of current season/weather together with the body shape. The device may display a part corresponding to a wound (abrasion, etc.) on the person's body through the output device, and may provide a measure (ointment and band attachment) corresponding to the wound. Further, based on the condition of the person's skin, hair, and the like, the device may provide information related to purchase of necessaries for the person.

When a plurality of persons enter and exit through the door, the device may independently identify different persons, and provide information by matching information corresponding to the identified person. That is, when the person currently photographed through the door camera is "A", "X" information may be provided using the accumulated data related to "A", and when the current person is "B", "Y" information may be provided using the accumulated data related to "B".

Meanwhile, the device may provide a customized function for shopping in association with a diet app. the device may recommend an appropriate time to buy clothing for the person in association with an application or weight scale that has a BMI (Body Mass Index) measurement function during a diet process. In some cases, the device may share clothes wearing shots, product and brand information with other users using the AI assistant device, and control such that the sharing user can receive advertising income according to the shared photos.

The device may infer physiognomy and fortune information of the entering/exiting person through the door and related images. This is done by an oriental studies solution pre-stored in the device. The oriental studies solution includes analysis programs related to the protagonist/fate and physiognomy. In addition, the device may analyze palmistry information of the visitor, match it with today's fortune information, and output the corresponding fortune information.

Meanwhile, the device identifies a person entering/exiting the door by acquiring voice information of the person entering/exiting the door using a voice input means such as a microphone (not shown), and accumulating and utilizing the corresponding data. That is, not only video information but also voice information may be utilized.

Figure 4:
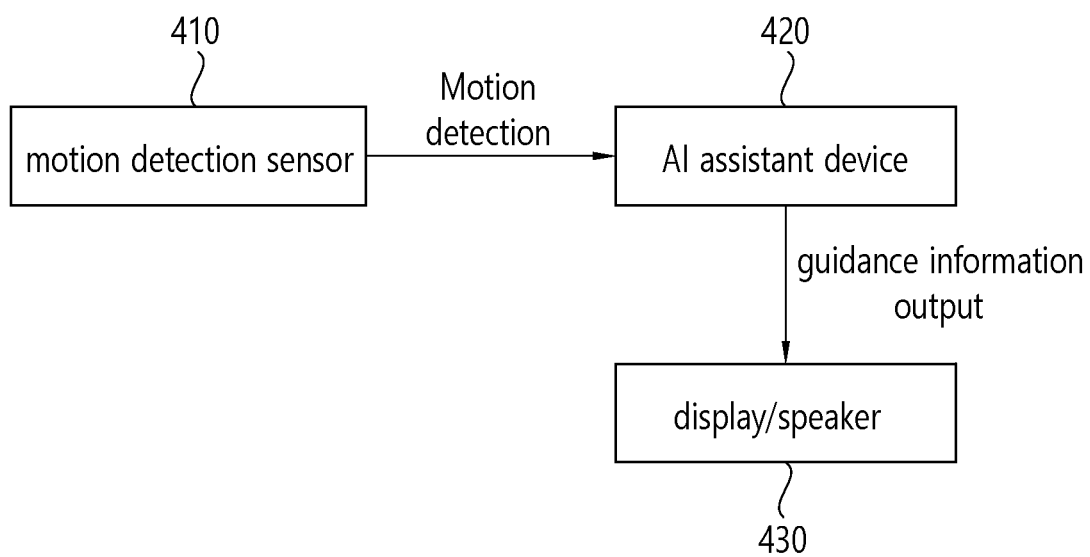
FIG. 4 is a conceptual diagram for explaining a process in which the AI assistant device based on door image analysis according to one embodiment of the present disclosure outputs guide information according to motion detection.

FIG. 4 is a conceptual diagram for explaining a process in which the AI assistant device based on door image analysis according to one embodiment of the present disclosure outputs guidance information according to motion detection.

Referring to FIG. 4, the AI assistant device 420 may output guidance information determined through the process of FIG. 3 at all times, but considering the aspect of reducing power consumption, the AI assistant device 420 may control such that the guidance information is output only when a person moves through the corresponding door. The device 420 may control such that the guide information is output through a method such as text display, video display, or audio display through the output device 430 only when a person's motion is detected within a preset range (e.g., a radius of 3 m from the door) through the motion detection sensor 410 or the door camera (not shown).

Figure 5:
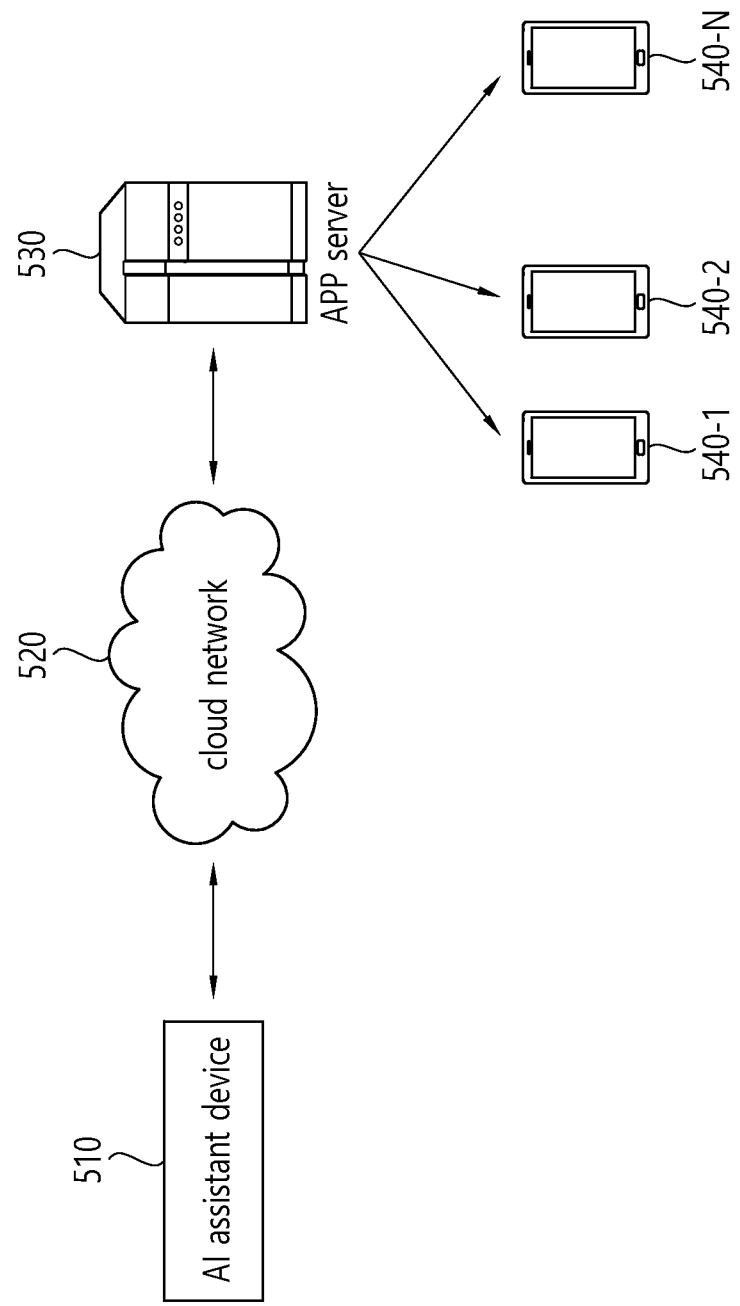
FIG. 5 is a conceptual diagram for explaining that the AI assistant device based on door image analysis according to one embodiment of the present disclosure operates in association with an application or a cloud server.

FIG. 5 is a conceptual diagram for explaining that the AI assistant device based on door image analysis according to one embodiment of the present disclosure operates in association with an application or a cloud server.

Referring to FIG. 5, the AI assistant device 510 can be connected to the Internet through a network 520 and can operate in association with a cloud server and/or an application server 530 through the Internet. The server 530 may share information with at least one of user terminals 540-1 to 540-N.

That is, the server 530 may be a server device related to an application running on the user terminals 540-1 to 540-N, and when the application is executed in the user terminals 540-1 to 540-N, the AI assistant device 510 may provide guidance information to the corresponding terminals. In this case, the server 530 may communicate using a cloud network or a home network. When communicating using the home network, the server 530 may be a home server. Alternatively, the communication may be performed in a device to device (D2D) method. In order to increase security, the AI assistant device 510 and the user terminals 540-1 to 540-N may communicate directly in a D2D manner. In addition, at least some of the information stored in the memory of the AI assistant device 510 may be delivered to the server 530 in real time or periodically.

The user terminals 540-1 to 540-N may be terminals possessed by persons entering/exiting the door, and users (e.g., family members) related to the persons. In this case, guidance information may also be set in advance to identify an entering/exiting person and provide only to a terminal corresponding to the identified person. That is, it may be set such that the information of the person "A" is transmitted only to the terminal 540-1 and the information of the person "B" is transmitted only to the terminal 540-2.

In addition, the AI assistant device 510 does not directly provide information to the user terminals 540-1 to 540-N, and the server 530 receives guidance information from the AI assistant device 510 in real time. Further, when there is a request from the user terminals 540-1 to 540-N, the server 530 may operate in a manner of directly providing guide information corresponding to the request. However, in order to increase security, it is preferable to directly provide image analysis information and/or guide information to the user terminals 540-1 to 540-N without storing user-related information in the server 530.

Figure 6:
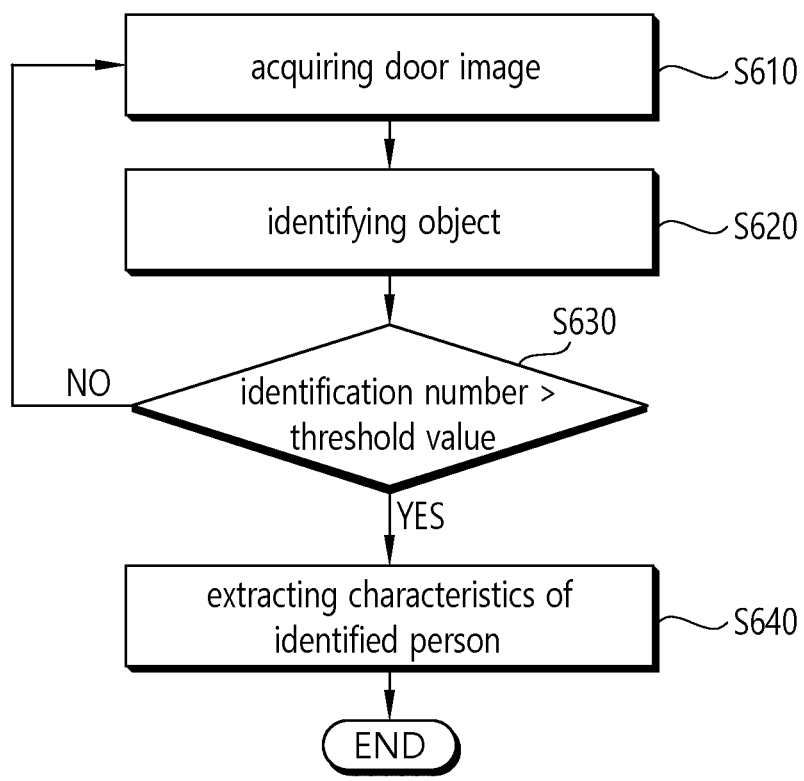
FIG. 6 is a flowchart showing a process in which the AI assistant device based on door image analysis according to one embodiment of the present disclosure identifies an entering/exiting person according to image analysis.

FIG. 6 is a flowchart showing a process in which the AI assistant device based on door image analysis according to one embodiment of the present disclosure identifies an entering/exiting person according to image analysis.

Referring to FIG. 6, when the device acquires an image from the door camera (S610), the device identifies an object present in the image using an object recognition algorithm (S620). In this case, if even information of a visitor who visits the house intermittently is analyzed and related information are provided, the processing capability of the device is wasted, so that the device determines whether the number of times a person is identified as a specific object is equal to or greater than a predetermined reference value (S630), and determines that the object is a person residing in the house only when it is determined that the number of times the person is identified as the specific object is equal to or greater than the reference value to infer the person's characteristic (S640). In this case, considering the concept of time together, the reference value may set based on how many times the person enters/exits within a reference period, such as a week or month.

Figure 7:
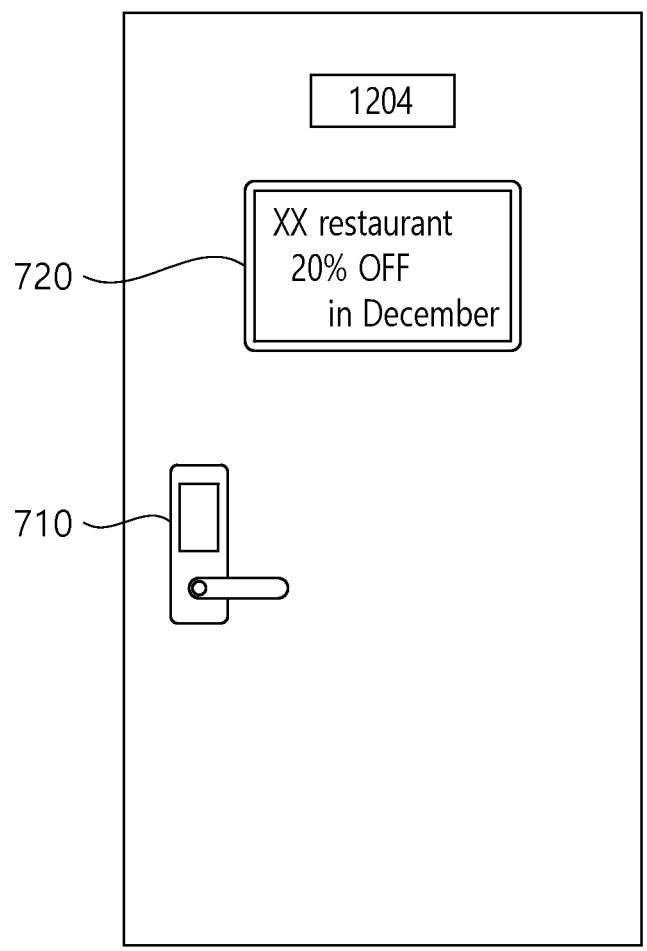
FIG. 7 is a conceptual diagram for explaining a process in which the AI assistant device based on door image analysis according to one embodiment of the present disclosure operates in association with a door lock device to display advertisement contents.

FIG. 7 is a conceptual diagram for explaining a process in which the AI assistant device based on door image analysis according to one embodiment of the present disclosure operates in association with a door lock device to display advertisement content.

Referring to FIG. 7, the AI assistant device (not shown) may operates in association with a door lock device 710 as well as a display device 720 attached to an outer side of the door. In this case, the AI assistant device may provide advertisement content information to the display device 720 using a network. The advertisement content information includes business advertising information. For example, the advertisement information includes discount information, coupon information, related product information, and the like of an XX restaurant existing within a predetermined radius from the house of the door to which the display device 720 is attached. Since the advertisement information may be advertisement information of a business existing within the predetermined radius from the house, the business providing advertisement contents (advertiser) provides advertisement contents to the AI assistant device through a local network, and the AI assistant device outputs the advertisement contents. Regarding an income obtained through the output of the advertisement contents, the advertiser may distribute a certain portion of the income. The display device 720 may be controlled to display the advertisement contents only when a person's approach is detected in association with a motion sensor (or camera).

Meanwhile, in some cases, the display device 720 may be integrally formed with the door lock device 710.

Figure 8:
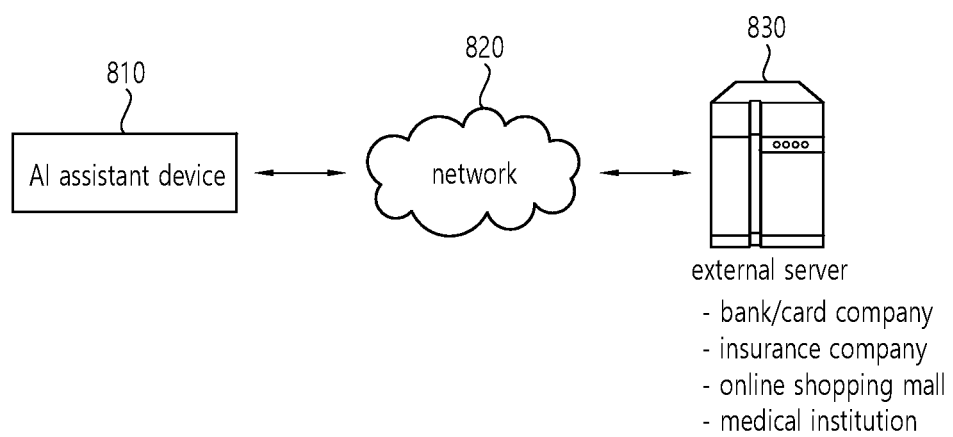
FIG. 8 is a conceptual diagram for explaining a process in which the AI assistant device based on door image analysis according to one embodiment of the present disclosure operates in association with an external server.

FIG. 8 is a conceptual diagram for explaining a process in which the AI assistant device based on door image analysis according to one embodiment of the present disclosure operates in association with an external server.

Referring to FIG. 8, an AI assistant device 810 may operate in association with an external server 830 through a network 820. In this case, the external server 830 may include a bank/card company server, an insurance company server, an online shopping mall server, a medical institution server, and other server devices.

The device 810 provides an online banking function in association with the bank/card company server associated with an entering/exiting person's account. Through this, online transactions such as account transfer and payment can be accomplished. In particular, since the device can operate in association with the online shopping mall server also, when the guide information is recommended product information, it can also provide a function of finding an appropriate online shopping mall through a lowest price search and purchasing a recommended product.

The device may operate in association with the medical institution server or the insurance company server to obtain information from a database of the corresponding institution. Accordingly, as described above, a simulation may be performed by inferring an event, an accident, and a degree of damage that may cause a change in an entering/exiting person's body. In addition, the above database information may be used for prediction of body changes. In particular, the device may obtain treatment information suitable for a current health condition in association with a medical institution server. As an example, when an abrasion is detected, the device searches a medical insurance database, makes a connection to a server of a hospital where the person frequently visits, and queries treatment at the connected hospital. When the person selects treatment, the device may receive appropriate medical treatment (medical treatment information) from the server by providing current state information (existence of abrasion and providing related images) to the corresponding server. This operation may be provided to the user terminal in association with the user terminal.

The device may use a database of criminal identity information and the like by operating in association with a server of a public institution such as a police station or a fire station. The device may compare video analysis information of a person with the criminal identity information obtained from the database, output guidance information, such as warning about a person suspected of being a criminal, and take automatic alarm response measures that notifies related authorities.

Figure 9:
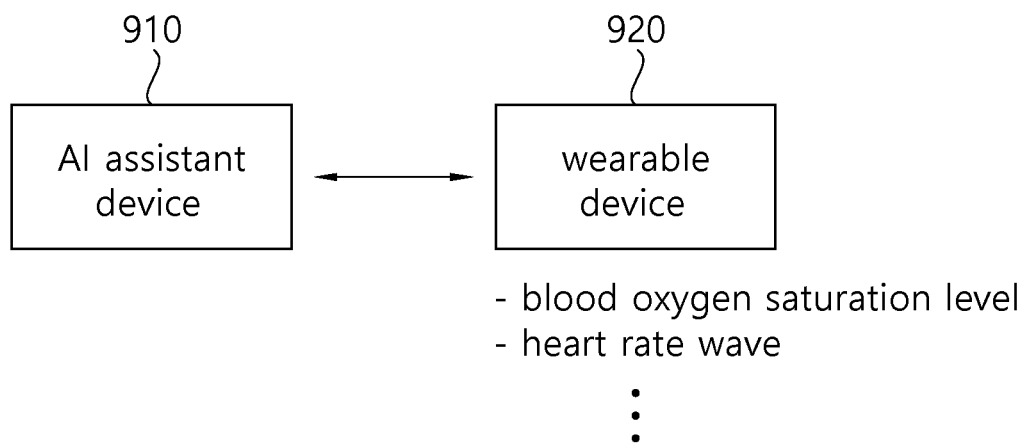
FIG. 9 is a block diagram showing that the AI assistant device based on door image analysis according to one embodiment of the present disclosure operates in association with a wearable device attached to a user.

FIG. 9 is a block diagram showing that the AI assistant device based on door image analysis according to one embodiment of the present disclosure operates in association with a wearable device attached to a user.

Referring to FIG. 9, an AI assistant device 910 may operate in association with a wearable device 920 attached to a user. The wearable device scans, analyzes, and stores body information including location information from the moment the user starts wearing it, and shares it with the AI assistant device 910. The wearable device 920 may measure an average blood oxygen saturation level, an average heart rate wave, and the like, which may be used individually or in combination as data for authenticating an entering/exiting person. That is, these data may be used to release the door lock device (not shown).

The device may process information obtained from the wearable device 920 in association with medical/insurance company information described in the embodiment of FIG. 8. The device may notify the server of the medical institution in response to the occurrence of values that deviate from a reference value with respect to values such as the average heart rate and blood oxygen saturation of the entering/exiting person in the wearable device 920. In this case, in order to check the information of the existing person, insurance company information may be utilized.

Figure 10:
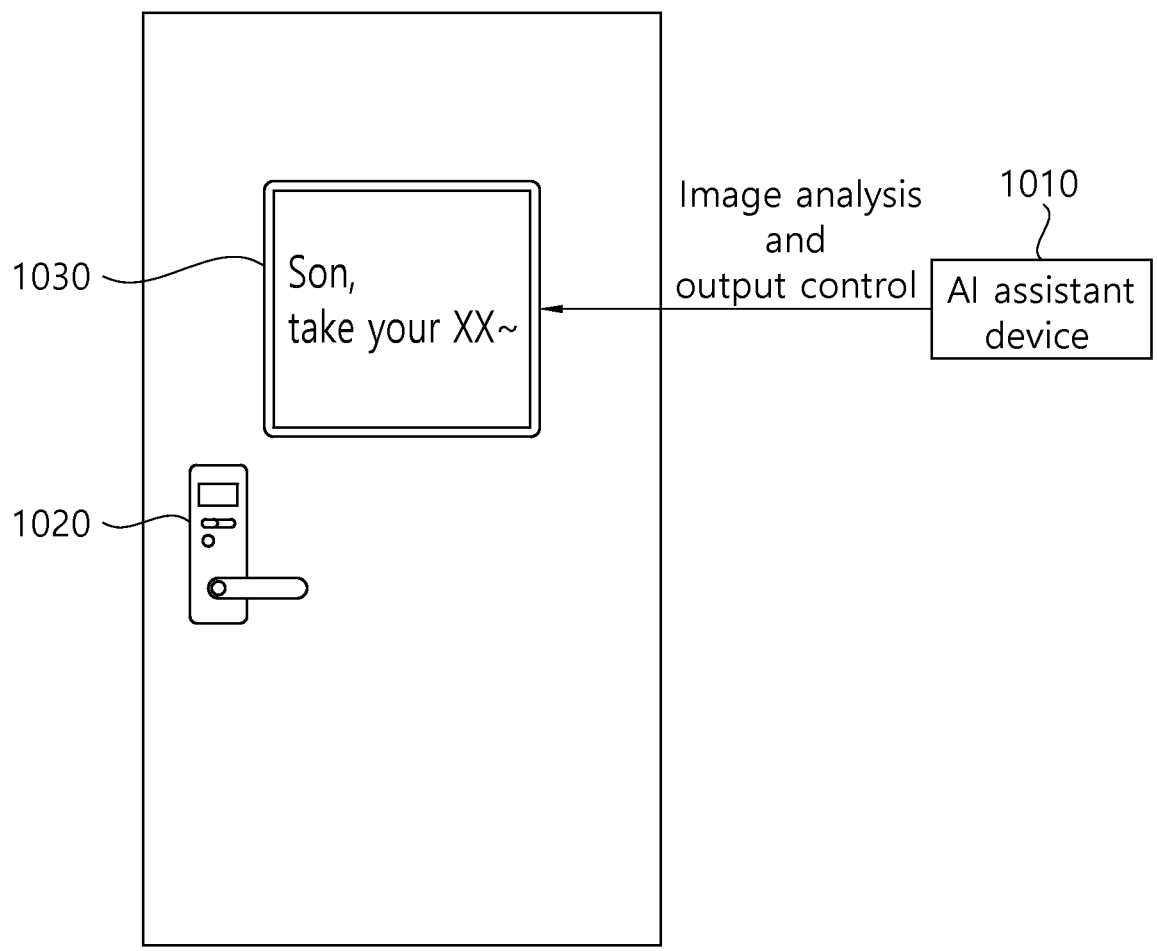
FIG. 10 is a conceptual diagram showing a memo function provided by the AI assistant device based on door image analysis according to one embodiment of the present disclosure.

FIG. 10 is a conceptual diagram showing a memo function provided by the AI assistant device based on door image analysis according to one embodiment of the present disclosure.

Referring to FIG. 10, an AI assistant device 1010 may operate in association with a display device 1030 attached to an upper portion and/or an inner portion of the door. In this case, the display device 1030 may leave a memo in the form of text or other pictures. The display device 1030 may be implemented as a touch screen and include an input device function, or a separate keyboard may be placed around it to input memos, and a memo message may be input using an input means of the user terminal or the AI assistant device 1010. The memo message may be a message that a person can see while leaving the door. For example, a mother may leave a message for her son, such as "Son, take your XX." In this case, the device 1010 may display the memo all the time, but may control the display device 1030 to display the message when the person who matches the contents of the message approaches the door. That is, an image (or voice) may be analyzed through the door camera (or the microphone), but the corresponding memo may be displayed when an approach to the door of the person who is the target of the memo message is detected. To this end, not only image/voice analysis but also message content analysis may be required. Accordingly, the AI assistant device 1010 may analyze the text of the memo message using a syntax analysis algorithm, extract terms that refer to objects included in it (e.g., mother, father, son, daughter, or their names, nicknames, etc.), match the corresponding images, and respond to the approach of a person corresponding to the matched image.

The device 1010 may store a plurality of memo messages together, identify a plurality of persons, and control the display device 1010 to display a first message for person A and a second message for person B at different times. Alternatively, when persons entering/exiting in a group, the first and second messages may be combined and displayed to persons A and B at the same time point.

In another example, a memo message may be delivered to a user terminal of a person who is the target of the memo message, and data may be transmitted so that the corresponding memo can be checked through an application or text message of the user terminal.

Although the present disclosure has been described above with reference to the drawings and the embodiment, it does not mean that the protection scope of the present disclosure is limited by the drawings or the embodiments, and those skilled in the art may understand that the present disclosure can be variously modified and changed without departing from the idea and the scope of the present disclosure described in the following claims.

What is claimed is:

1. An artificial intelligence (AI) assistant device based on door image analysis, comprising:
    an image receiver for receiving an image captured by a camera attached to a door, the image including a person entering or exiting the door;
    a storage that stores the received image; and
    a processor that is operatively coupled to the image receiver and the storage and is configured to
        infer characteristics of the entering or exiting person by analyzing the image stored in the storage using an AI model that includes an image analysis model, a voice analysis model, a model that infers object characteristics, and a model that retrieves and outputs information corresponding to the inferred characteristics,
        identify the entering or exiting person based on the received image,
        determine whether a count of a number of times the identified person has entered or exited during a reference period is greater than a reference value, and
        output the information corresponding to the inferred characteristics by inferring the characteristics of the entering or exiting person only when the count is greater than the reference value.

2. The AI assistant device of claim 1, further comprising:
    a display device for visualizing and displaying the information corresponding to the inferred characteristics; and
    a speaker for outputting the information corresponding to the inferred characteristics as a voice.

3. The AI assistant device of claim 2,
    wherein the display device includes a touch screen, and
    wherein the display device is configured to display memo information to the entering or exiting person through the touch screen.

4. The AI assistant device of claim 3,
    wherein the processor is further configured to identify a person in the image by analyzing an object in the image,
    wherein the processor is further configured to identify a person related to the memo information, and wherein the memo information is displayed when the identified person related to the memo information enters the door.

5. The AI assistant device of claim 1, further comprising:
a motion sensor for detecting that a person is moving,
wherein the processor is further configured to output the information corresponding to the inferred characteristics when motion is detected through the motion sensor.

6. The AI assistant device of claim 5, wherein the processor is further configured to
identify the person causing motion to be detected, and
infer the characteristics of the identified person.

7. The AI assistant device of claim 1, wherein the processor is further configured to
communicate with a server device associated with an application running on a user terminal, and
output the information corresponding to the inferred characteristics to the user terminal when the application is executed in the user terminal.

8. The AI assistant device of claim 7, wherein
the server device communicates in a cloud-based network, a home network, or a D2D (Device to Device) manner, and
information stored in the storage is transmitted to the server device.

9. The AI assistant device of claim 1,
wherein the processor is further configured to identify each of a first entering or exiting person and a second entering or exiting person, inform the first entering or exiting person of first information corresponding thereto, and inform the second entering or exiting person of second information corresponding thereto, and
wherein the first entering or exiting person and the second entering or exiting person are respectively identified by determining whether a count of a number of times either person has entered or exited the door exceeds the reference value.

10. The AI assistant device of claim 1,
wherein the processor is further configured to analyze the stored image to infer physiognomy information and fortune information of the entering or exiting person,
wherein the physiognomy information and fortune information are inferred using an oriental studies solution.

11. The AI assistant device of claim 1, further comprising:
a microphone for acquiring voice information of the entering or exiting person,
wherein the processor is further configured to infer the characteristics of the entering or exiting person using the voice information acquired through the microphone.

12. The AI assistant device of claim 1, wherein the artificial intelligence model operates in association with a server that manages criminal identity information, medical information, and insurance information to provide information related to the entering or exiting person using the criminal identity information, the medical information, and the insurance information.

13. The AI assistant device of claim 1, wherein the AI assistant device operates in association with an online banking server related to an account of the entering or exiting person to provide online banking function using the account.

14. The AI assistant device of claim 1, wherein the processor operates in association with a wearable device that is attached to the entering or exiting person and measures a health status of the entering or exiting person wherein the processor provides medical and insurance information related to the entering or exiting person using information obtained from the wearable device.

15. The AI assistant device of claim 14, wherein the wearable device acquires information on at least one of an average blood oxygen saturation level and an average heart rate wave value and provides the acquired information to the processor.

16. The AI assistant device of claim 1,
wherein the processor is further configured to analyze an object in the stored image through dynamic data, and
wherein the dynamic data includes at least one of a video, a light source, and a graph.

17. The AI assistant device of claim 16, wherein data to be analyzed by the processor include at least one of a body shape, size, shadow by time, light reflection of a body depending on a light source, skeleton, head, hair, hand shape, fingerprint, palm lines, pores, blood vessels, retina, iris, face, body temperature, gait, voice and sound waves of the entering or exiting person.

18. The AI assistant device of claim 1, wherein the processor is further configured to utilize at least one of
information related to the entering or exiting person in a social network service (SNS) and an application server, and
information stored in a memory of a device carried by the entering or exiting person.

19. The AI assistant device of claim 10, wherein the processor is further configured to infer the fortune information of the entering or exiting person by analyzing palmistry information of the entering or exiting person.

20. An artificial intelligence (AI) assistant system based on door image analysis, comprising:
a camera attached to a door to photograph a person entering or exiting the door;
an output device; and
an AI assistant device configured to
infer characteristics of the entering or exiting person by analyzing an image from the camera using an AI model that includes an image analysis model, a voice analysis model, a model that infers object characteristics, and a model that retrieves and outputs information corresponding to the inferred characteristics,
identify the entering or exiting person based on the received image,
determine whether a count of a number of times the identified person has entered or exited during a reference period is greater than a reference value, and
output, via the output device, the information corresponding to the inferred characteristics by inferring the characteristics of the entering or exiting person only when the count is greater than the reference value.

* * * * *